Feb. 28, 1961

C. S. PRENDERGAST 2,972,953

ROTARY PUMPS AND MOTORS

Filed Jan. 22, 1958

Inventor
CHARLES SCOTT PRENDERGAST,
By *John B. Brady*
Attorney

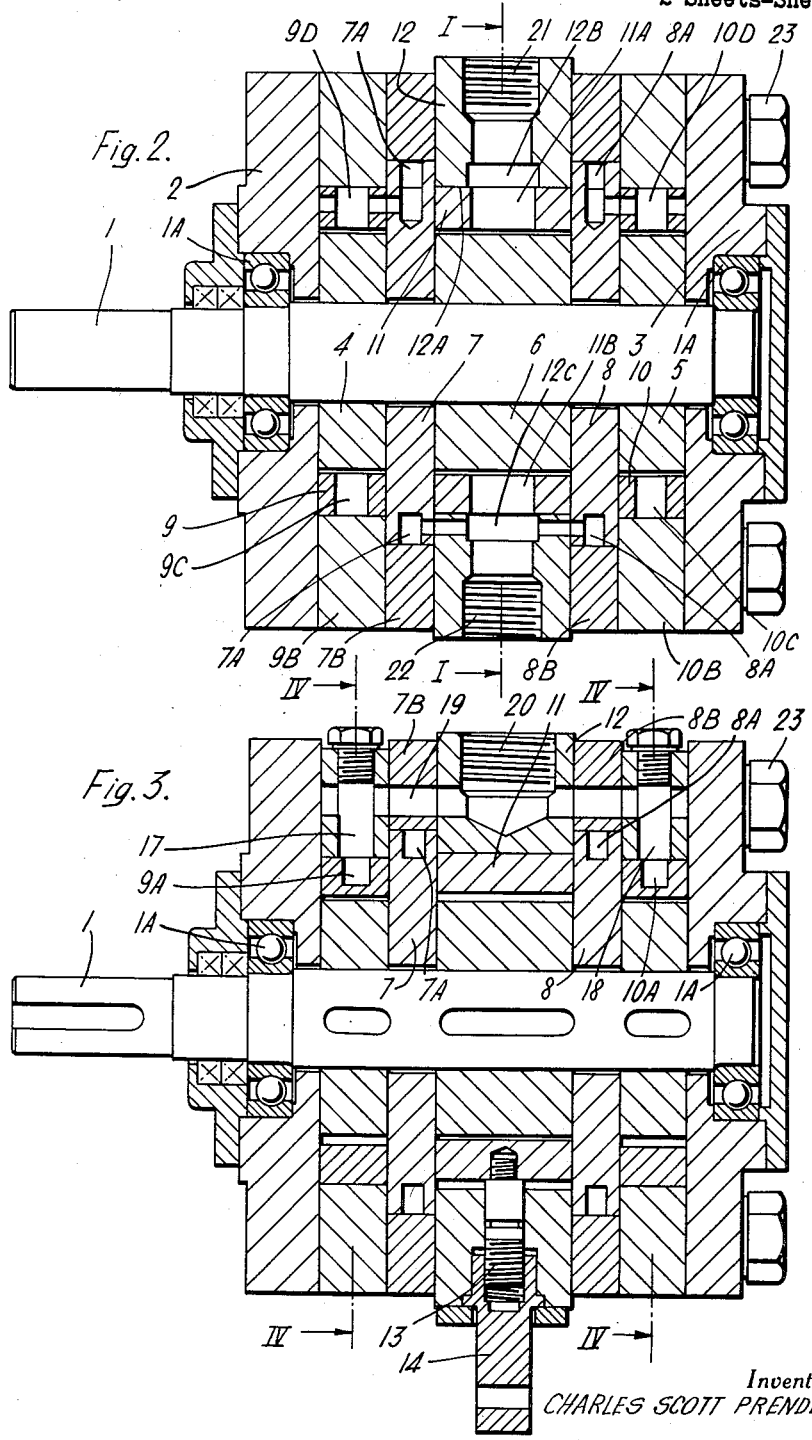

United States Patent Office 2,972,953
Patented Feb. 28, 1961

2,972,953
ROTARY PUMPS AND MOTORS

Charles Scott Prendergast, Shoreham by Sea, England, assignor to Brakeshoe International, S.A., Geneva, Switzerland, a corporation of Switzerland Filed Jan. 22, 1958, Ser. No. 710,573

Claims priority, application Great Britain Apr. 15, 1957

5 Claims. (Cl. 103—4)

This invention relates to pumps and motors of the kind having three circular rotors keyed to a central rotatable shaft, a similar number of circularly bored stators surrounding said rotors and mounted eccentrically in relation to the axis of the rotor shaft, and vanes slidable in radial grooves in the rotors, the arrangement being such that when in the case of a pump the rotor shaft rotates, the vanes displace fluid by sweeping the annular spaces between the peripheries of the rotors and the stators bores while in the case of a motor fluid injected under pressure into said spaces causes rotation of the rotor.

The invention provides an improved machine of this kind in which the total fluid displacement or the output can be varied from zero to maximum by adjusting the eccentricity of only one of the stator bores.

In one form of the invention an adjustable stator is carried in a slide so that the centre of its bore can be moved from a position on one side of the rotor shaft axis through said axis to a position an equal distance on the opposite side thereof. The slide is formed in a casing member provided with inlet and outlet port connections. Any suitable means is used for adjusting the positions of said stator such as a screw, cam or hydraulic piston. Two fixed stators, having constant and similar eccentricity in relation to the rotor shaft axis are positioned one on each side of the adjustable stator, these fixed stators and their rotors being separated from the adjustable stator and its rotor by two stationary partitioning members. The annular spaces between the rotors and stators are so interconnected by ducts in the stationary partitioning members that the fluid displacement caused by the rotor rotating inside the adjustable stator is added to the fluid displacement caused by the rotors rotating inside the fixed stators when the centre of the adjustable stator is on the opposite side of the rotor shaft axis to the centres of the fixed stators, and is substracted from the fluid displacement caused by the rotors rotating inside the fixed stators when the centre of the adjustable stator is on the same side of the rotor shaft axis as the centres of the fixed stators. In this way the total fluid displacement of the pump is variable from maximum to zero by moving the adjustable stator as described.

A separate inlet port may be provided in each of the fixed stators; alternatively suitable ducts may be provided in the stationary dividing plates and/or the end members to link up the expanding annular spaces between the fixed stators and their rotors to the inlet port provided in the casing member in which the slide is formed.

The chambers formed by the adjustable stator and its rotor are connected to two ports in the casing member surrounding the stator, one of which ports may be the delivery port for the fixed stators and the other acting as an input port when the eccentricity of the adjustable stator is opposed to the eccentricity of the fixed stators and acting as an outlet port when the eccentricity of the adjustable stator is in the same direction as the eccentricity of the fixed stators.

In the case of a motor or slow-running pump, springs may be used to hold the vanes in contact with the stator bores when starting. Alternatively, in the case of a motor, the pressurized driving fluid may be fed into the spaces at the bottoms of the vanes through suitable ducts, thus forcing the vanes against the stator bores.

A feature of the invention resides in arranging that the area of the periphery of the bore of the adjustable stator that is under pressure is always slightly greater than the area under pressure on the outside of the adjustable stator, thereby creating an effective seal between the adjustable stator and the slide, and thus isolating the high pressure ducts of the pump or motor from the low pressure ducts.

The invention will be fully understood from the foregoing together with the further description that follows, and the accompanying drawing whereon, by way of example, one form of the pump or motor is shown.

Fig. 1 of the drawings represents a cross section on the line I—I of Fig. 2.

Fig. 2 represents a longitudinal section on the line II—II of Fig. 1.

Fig. 3 represents a longitudinal section on the line III—III of Fig. 1.

Figure 1:
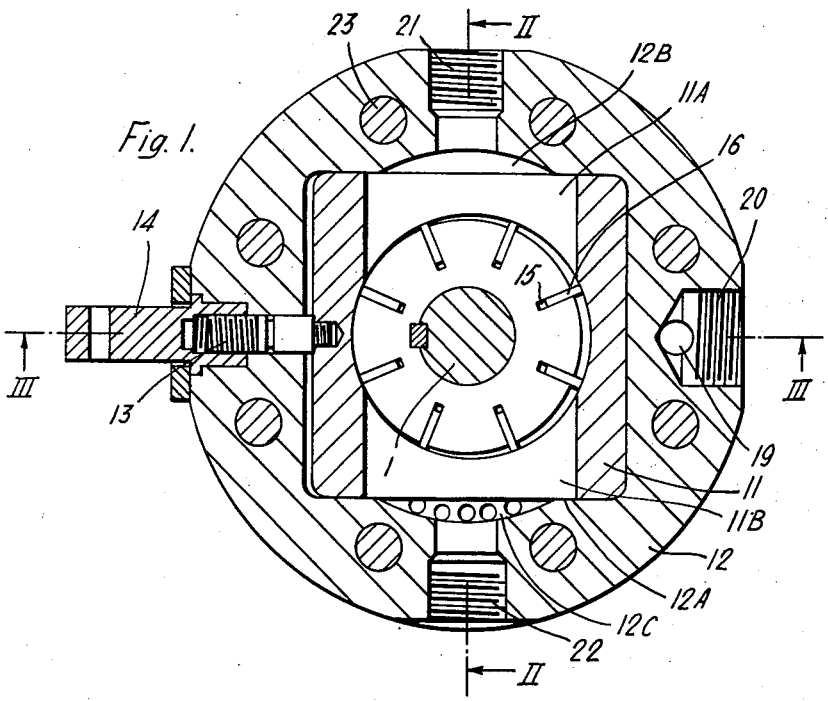
Figure 4:
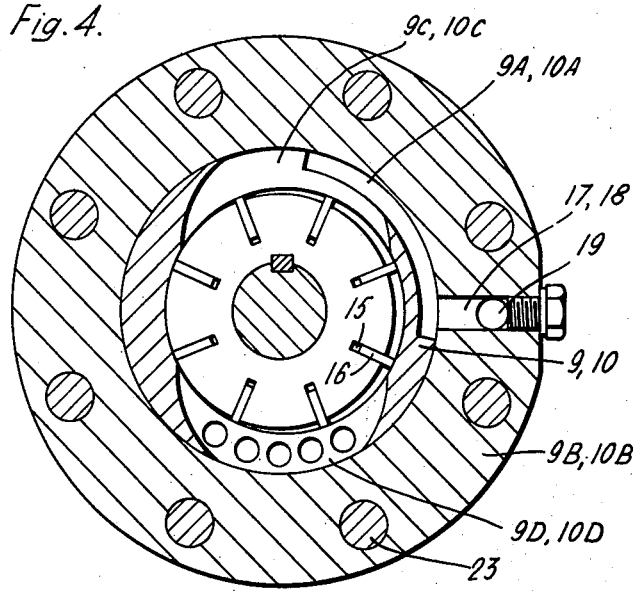
Fig. 4 represents a cross section in either of the planes IV—IV of Fig. 3.

As illustrated a driving shaft 1 is carried in ball-bearings 1A housed in end members 2 and 3. Keyed to the driving shaft, concentrically in relation to its axis, are three circular rotors 4, 5 and 6. The rotors 4 and 5 are adjacent to the end members 2 and 3 respectively and are separated from the intermediate rotors 6 by two stationary partitioning members 7 and 8. The partitioning members 7 and 8 have annular grooves 7A and 8A formed around their peripheries and fit inside surrounding members 7B and 8B of the same axial width as said partitioning members, so that the annular grooves 7A and 8A are completely enclosed. The motors 4 and 5 are contained in the circular bores of stator members 9 and 10 and the bores of these stator members have equal and fixed eccentricities in relation to the axis of the driving shaft 1. The stator members 9 and 10 have partly annular grooves 9A and 10A Figs. 3 and 4 formed around their peripheries over an angular distance of about 90° and fit inside surrounding members 9B and 10B of the same axial width as said stator members so that the partly annular grooves 9A and 10A are completely enclosed. The intermediate rotor 5 is contained in the circular bore of a stator member 11 which itself is slidably mounted in slides 12A formed in a surrounding casing member 12. The position of the stator member 11 can be adjusted in the slides 12A by an adjusting screw 13 and nut 14. By means of this adjustment the stator 11 can be moved in relation to the axis of the driving shaft 1 so as to bring the bore of the stator 11 to any position between one of maximum eccentricity in one direction and one of maximum eccentricity in the opposite direction in relation to said axis. The diameters of the bores of all the stator members 9, 10 and 11 are sufficiently greater than the outside diameters of the rotors 4, 5 and 6 to afford eccentricity.

All the stationary members 2, 9, 9B, 7, 7B, 12, 8, 8B, 10, 10B and 3 are secured rigidly together by bolts 23.

In each of the rotors are formed eight equidistantly spaced radial grooves 15, these grooves extending radially inwards from the periphery of the rotor. Slidably mounted in each groove 15 there is a vane 16 the outer end of which is shaped to conform approximately with the shape of the periphery of the bore of the pertaining stator. When the shaft 1 is rotated the vanes in the rotors 4, 5 and 6 are brought into contact with the peripheries of the bores of the surrounding stators 9, 10 and 11 by centrifugal force. The vanes 16 of each rotor form with the periphery of the rotor and the bore of the corresponding stator and the partitioning and end members, eight enclosed arcuate chambers and these chambers expand and contract in volume as the rotor is rotated.

The fixed stators 9 and 10 have arcuate grooves 9C, 9D, 10C and 10D formed in the peripheries of their bores, the two grooves in each stator being diametrically opposite to one another. Each of the arcuate grooves 9C and 10C is connected to one extremity of each of the partly annular grooves 9A and 10A. The other extremities of the partly annular grooves 9A and 10A are connected by radial holes 17 and 18 in the surrounding members 9B and 10B to an axial hole 19 which passes through the members 7B and 8B and the member 12 surrounding the intermediate stator 11. A screw-threaded inlet port 20, formed in the member 12 connects to the axial hole 19. When the shaft 1 is rotated, the expanding chambers of the rotors 4 and 5 are filled with fluid fed from the inlet port 20 into the arcuate grooves 9C and 10C. The contracting chambers connect with the arcuate grooves 9D and 10D. The adjustable stator 11 has two enclosed radial grooves 11A and 11B which pass through it and connect to two further arcuate grooves 12B and 12C in the slide 12A of the surrounding member 12. The area of the mouth of each of the grooves 12B and 12C is slightly less than the projected area of half the periphery of the bore of the stator 11, thus ensuring that the slide forms a seal by means of fluid pressure. The grooves 11A and 11B are on the same diametral centre line as the grooves 9C and 9D and the grooves 10C and 10D, but the grooves 11A and 12B are at 180° to the grooves 9C and 10C, and the grooves 11B and 12C are at 180° to the grooves 9D and 10D. Radial screw-threaded ports 21 and 22 formed in the member 12 connect respectively with the grooves 12B and 12C. Grooves 9D and 10D are connected respectively to the enclosed annuli 7A and 8A formed in the partitioning members 7 and 8. The annuli 7A and 8A are also connected to the groove 12C. When the shaft is rotated the fluid, displaced by the contracting chambers of the rotors 4 and 5 passes through the grooves 9D and 10D around the annuli 7A and 8A into the radial groove 12C and thence through the outlet port 22.

When the relative eccentricity of the stator 11 and the rotor 6 is opposed to the relative eccentricity of the stators 9 and 10 and the rotors 4 and 5, fluid is fed in through the port 21 to the expanding chambers of the rotor 6, and the fluid displaced by the contracting chambers of the rotor 6 is added to that displaced by the contracting chambers of the rotors 4 and 5, the total flow passing out through the outlet port 22.

When there is no relative eccentricity between the stator 11 and the rotor 6, no displacement takes place between them and under this condition the total displacement of the pump is that obtained from the displacement chambers of only the rotors 4 and 5.

When the relative eccentricity of the stator 11 and the rotor 6 is in the same direction as the relative eccentricity of the stators 9 and 10, and the rotors 4 and 5, the displacement chambers of the rotor 6 absorb part or all the displacement of the rotors 4 and 5 according to the degrees of eccentricity, the fluid absorbed returning to supply through the port 21.

The grooves 9C and 9D in the stator 9, the grooves 10C and 10D in the stator 10, and the grooves 11A and 11B in the stator 11 are separated from one another at each end by an angular distance slightly greater than the angular distance between any pair of adjacent vanes 16 in the rotors 4, 5 and 6. By reason of this a seal is always provided between the expanding and contracting chambers of each rotor.

I claim:

1. A rotary pump or motor comprising a pair of end vane rotor sections and an intermediate vane rotor section mounted for rotation in unison, said vane rotor sections arranged in axially spaced relation, partition means separating said rotor sections, a pair of end stator sections and an intermediate stator section receiving said end and intermediate vane rotor sections, the end stator sections having fixed eccentric relation to the end vane rotor sections, and the intermediate stator section having variable eccentric relation to the intermediate vane rotor section, means to adjust the eccentricity of the intermediate stator section in the same direction or in opposition to the relative eccentricity of the end stator sections, the intermediate rotor and stator section being axially substantially twice as wide as the axial width of each end rotor and stator section to thereby have pumping displacement substantially equal to the combined displacement of the end rotor and stator sections, radial inlet-outlet passage means for the intermediate stator section, common outlet passage means for said end and intermediate stator sections, and inlet passage means common to said end stator sections and in non-communicating relation to the intermediate stator section, whereby when the eccentricity of the intermediate stator section is opposed to the eccentricity of the end stator sections fluid is fed in through said inlet-outlet passage means and added to the fluid displaced by the end rotor sections, and when the eccentricity of the intermediate stator section is in the same relative direction as the eccentricities of the end stator sections the displacement in the intermediate stator section will be subtracted from the displacement of the end stator sections.

2. A rotary pump or motor as set forth in claim 1 in which said partition means carry ducts extending outwardly and circumferentially of said rotor sections for communicating said common outlet passage means with said end stator sections.

3. A rotary pump or motor as set forth in claim 1 in which said inlet passage means common to said end stator sections includes axial ducts disposed outwardly of said rotor sections.

4. A rotary pump or motor comprising a pair of end vane rotor sections and an intermediate vane rotor section mounted for rotation in unison, said vane rotor sections arranged in axially spaced relation, partition means separating said rotor sections, a pair of end stator sections and an intermediate stator section receiving said end and intermediate vane rotor sections, the end stator sections having fixed eccentric relation to the end rotor sections, and the intermediate stator section having variable eccentric relation to the intermediate vane rotor section, means to adjust the eccentricity of the intermediate stator section in the same direction or in opposition to the relative eccentricity of the end stator sections, the intermediate rotor and stator section being axially substantially twice as wide as the axial width of each end rotor and stator section to thereby have pumping displacement substantially equal to the combined displacement of the end rotor and stator sections, radial inlet-outlet passage means for the intermediate stator section, common outlet passage means for said end and intermediate stator sections, and inlet passage means common to said end stator sections and in non-communicating relation to the intermediate stator section.

5. A rotary pump or motor as set forth in claim 4 in which said end stator sections carry arcuate grooves on the outlet side thereof, annular ducts carried by said partition means, axially disposed ducts connecting said arcuate grooves on the outlet side of said end stator sections with one portion of said annular ducts, and axially disposed ducts connecting said annular ducts with said common outlet passage means.

References Cited in the file of this patent

UNITED STATES PATENTS

| | | |
|---|---|---|
| 550,466 | Westinghouse | Nov. 26, 1895 |
| 1,943,929 | Rayburn | Jan. 16, 1934 |
| 1,988,213 | Ott | Jan. 15, 1935 |
| 2,062,310 | Hittell | Dec. 1, 1936 |
| 2,368,789 | Tucker | Feb. 6, 1945 |
| 2,513,446 | Brown | July 4, 1950 |
| 2,541,197 | Breedlove | Feb. 13, 1951 |
| 2,691,482 | Ungar | Oct. 12, 1954 |
| 2,764,941 | Miller et al. | Oct. 2, 1956 |
| 2,804,016 | Moore | Aug. 27, 1957 |

FOREIGN PATENTS

| | | |
|---|---|---|
| 162,128 | Australia | Mar. 23, 1955 |